(12) United States Patent
Stephens et al.

(10) Patent No.: US 6,259,772 B1
(45) Date of Patent: Jul. 10, 2001

(54) MESSAGE DELIVERY SYSTEM WITH SPECIAL FEATURES

(75) Inventors: Christopher Stephens, Ipswich; Paul J Fishburn, Oxon, both of (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/068,536

(22) PCT Filed: Feb. 26, 1998

(86) PCT No.: PCT/GB98/00606

§ 371 Date: May 13, 1998

§ 102(e) Date: May 13, 1998

(87) PCT Pub. No.: WO98/38782

PCT Pub. Date: Sep. 3, 1998

(30) Foreign Application Priority Data

Feb. 26, 1997 (GB) .................................................. 9703996

(51) Int. Cl.[7] ...................................................... H04M 1/64
(52) U.S. Cl. ..................................... 379/88.23; 379/88.11
(58) Field of Search .......................... 379/67.1, 69, 88.01, 379/88.04, 88.21, 88.22, 88.23, 88.25, 88.26, 88.27, 207, 88.11, 88.19, 88.2, 88.28

(56) References Cited

U.S. PATENT DOCUMENTS

| | | | | |
|---|---|---|---|---|
| 4,790,003 | * | 12/1988 | Kepley et al. | 379/88.18 |
| 4,866,759 | * | 9/1989 | Riskin | 379/93.27 |
| 4,939,771 | * | 7/1990 | Brown et al. | 379/88.26 |
| 4,998,272 | * | 3/1991 | Hawkins, Jr. et al. | 379/88.24 |
| 5,040,208 | * | 8/1991 | Jolissaint | 379/209 |
| 5,134,646 | * | 7/1992 | Carlson | 379/88.2 |
| 5,168,515 | * | 12/1992 | Gechter et al. | 379/265 |

(List continued on next page.)

FOREIGN PATENT DOCUMENTS

| | | |
|---|---|---|
| 93 02 865 U | 7/1993 | (DE) . |
| 42 33 066 | 4/1994 | (DE) . |
| 0 036 619 | 9/1981 | (EP) . |
| 0 106 575 | 4/1984 | (EP) . |
| 0 588 101 | 3/1994 | (EP) . |
| 0 619 668 | 10/1994 | (EP) . |
| 0 639 018 | 2/1995 | (EP) . |
| 2 206 265 | 12/1988 | (GB) . |
| 2 294 608 | 5/1996 | (GB) . |
| 4-306030 | * 10/1992 | (JP) . |
| 94 06236 | 3/1994 | (WO) . |
| 97/04574 | 2/1997 | (WO) . |
| WO 98/42116 | 9/1998 | (WO) . |

OTHER PUBLICATIONS

Merriam Webster's Colegiate Dictionary, 1997, 10th Ed., ISBN 0–87779–709–9, p. 729.*

Patent Abstracts of Japan, vol. 013, No. 235 (E–766), May 30, 1989 & JP 01 041554 A (Toshiba Corp.), Feb. 13, 1989.

Patent Abstracts of Japan, vol. 015, No. 340 (E–1105), Aug. 28, 1992 & JP 03 128561 A (NEC Corp.; Others:01), May 31, 1991.

(List continued on next page.)

*Primary Examiner*—Fan Tsang
*Assistant Examiner*—Roland G. Foster
(74) *Attorney, Agent, or Firm*—Nixon & Vanderhye P.C.

(57) ABSTRACT

A method of voice message transmission is performed within a telecommunication network. It may include:
recording, via a telephone line from a first terminal, a voice message to a designated second terminal; attempting to connect to the second terminal via a telephone line; where the step of attempting to connect is successful, regenerating the recorded message to the second terminal; and under predetermined conditions, attempting to set up a return call to the first terminal.

29 Claims, 15 Drawing Sheets

U.S. PATENT DOCUMENTS

| | | | |
|---|---|---|---|
| 5,181,236 | | 1/1993 | Lavallee et al. . |
| 5,199,062 | * | 3/1993 | Von Meister et al. ............ 379/88.04 |
| 5,216,709 | | 6/1993 | Wen et al. . |
| 5,222,120 | * | 6/1993 | McLeod et al. .................. 379/88.24 |
| 5,268,957 | * | 12/1993 | Albrecht .............................. 379/67.1 |
| 5,313,515 | | 5/1994 | Allen et al. .......................... 455/413 |
| 5,333,180 | * | 7/1994 | Brown et al. ..................... 379/88.06 |
| 5,425,091 | * | 6/1995 | Josephs ................................ 379/201 |
| 5,463,676 | | 10/1995 | Ohsawa . |
| 5,497,413 | | 3/1996 | Nakano . |
| 5,533,100 | * | 7/1996 | Bass et al. ........................ 379/88.06 |
| 5,535,264 | * | 7/1996 | Starr et al. ........................ 379/88.25 |
| 5,539,809 | | 7/1996 | Mayer et al. . |
| 5,644,624 | * | 7/1997 | Caldwell ................................ 379/69 |
| 5,646,982 | * | 7/1997 | Hogan et al. ..................... 379/88.22 |
| 5,751,794 | * | 5/1998 | Kugell et al. ..................... 379/88.22 |
| 5,778,052 | * | 7/1998 | Rubin et al. ...................... 379/88.25 |
| 5,930,343 | | 7/1999 | Vasquez . |

OTHER PUBLICATIONS

Patent Abstracts of Japan, vol. 017, No. 234 (E–1362), May 12, 1993 & JP 04 361461 A (Matsushita Electric Ind Co., Ltd.), Dec. 15, 1992.

Patent Abstracts of Japan, vol. 012, No. 457 (E–688), Nov. 30, 1988 & JP 73 182955 A (Maisushita Electric Ind Co Ltd), Jul. 28, 1988.

Patent Abstract of Japan, vol. 17, No. 134 (E–1334), Mar. 19, 1993 & JP 04 306030A (Mitsubishi Electric Corp), Oct. 28, 1992.

Patent Abstract of Japan, vol. 008, No. 039 (E–228), Feb. 21, 1984 & JP 58 196754A (Tokyo Shibaura Denki KK), Nov. 17, 1983.

Patent Abstract of Japan, vol. 097, No. 003, Mar. 31, 1997 & JP 08 293920A, (NEC Corp), Nov. 5, 1996.

Patent Abstract of Japan, vol. 008, No. 206(E–267), Sep. 20, 1984 & JP 59 092663 (Nippon Denki KK), May 28, 1984.

Patent Abstract of Japan, vol. 010, No. 356 (E–459), Nov. 29, 1986 & JP 61 154254A (NEC Corp), Jul. 12, 1986.

Patent Abstract of Japan, vol. 017, No. 680, (E–1476), Dec. 14, 1993 & JP 05 227287A (Matsushita Electric Ind Co Ltd), Sep. 3, 1993.

Gould J D et al.: "Speech Filing—An Office System for Principasl" IMB Systems Journal, vol. 23, No. 1, 1984, pp. 65–81.

* cited by examiner

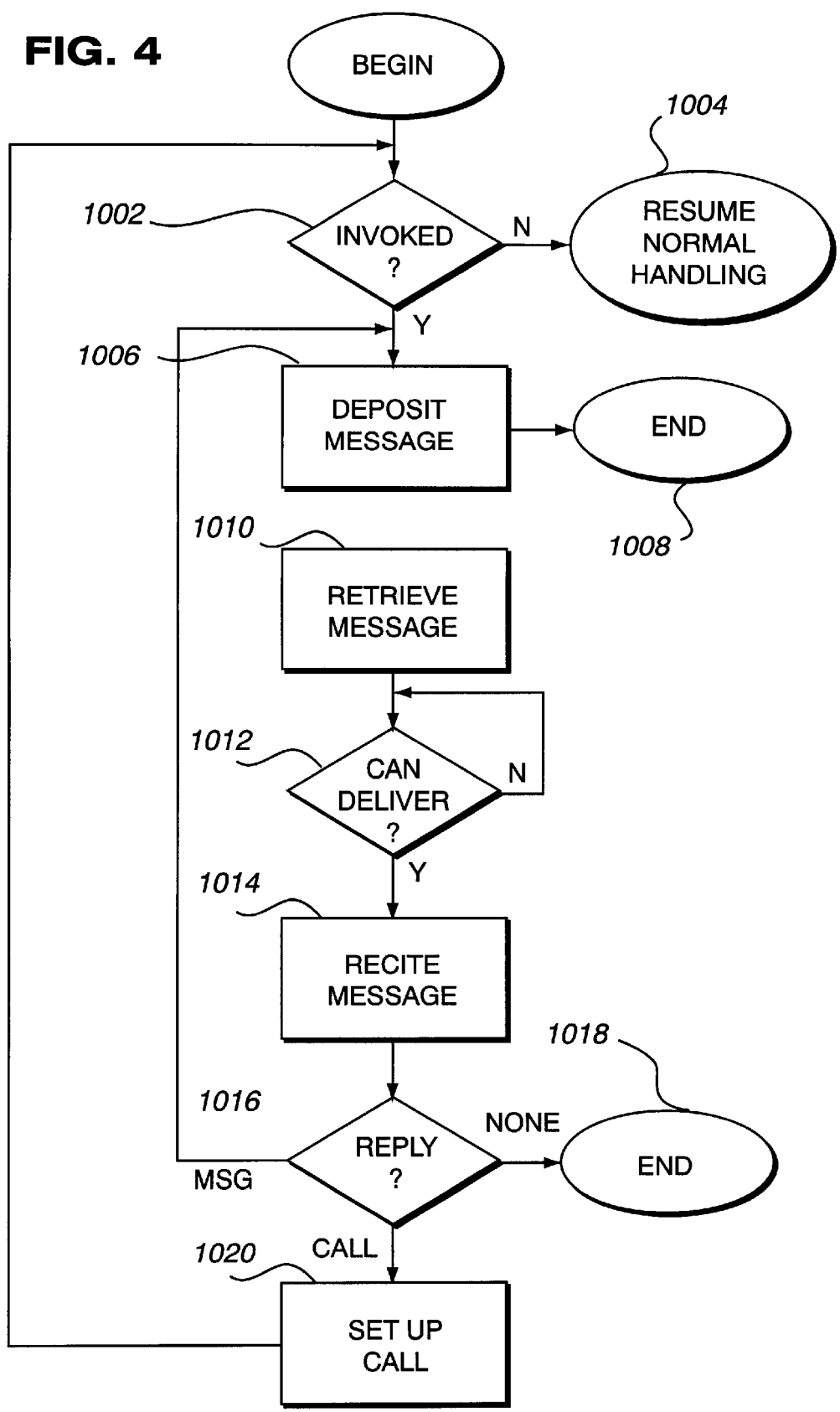

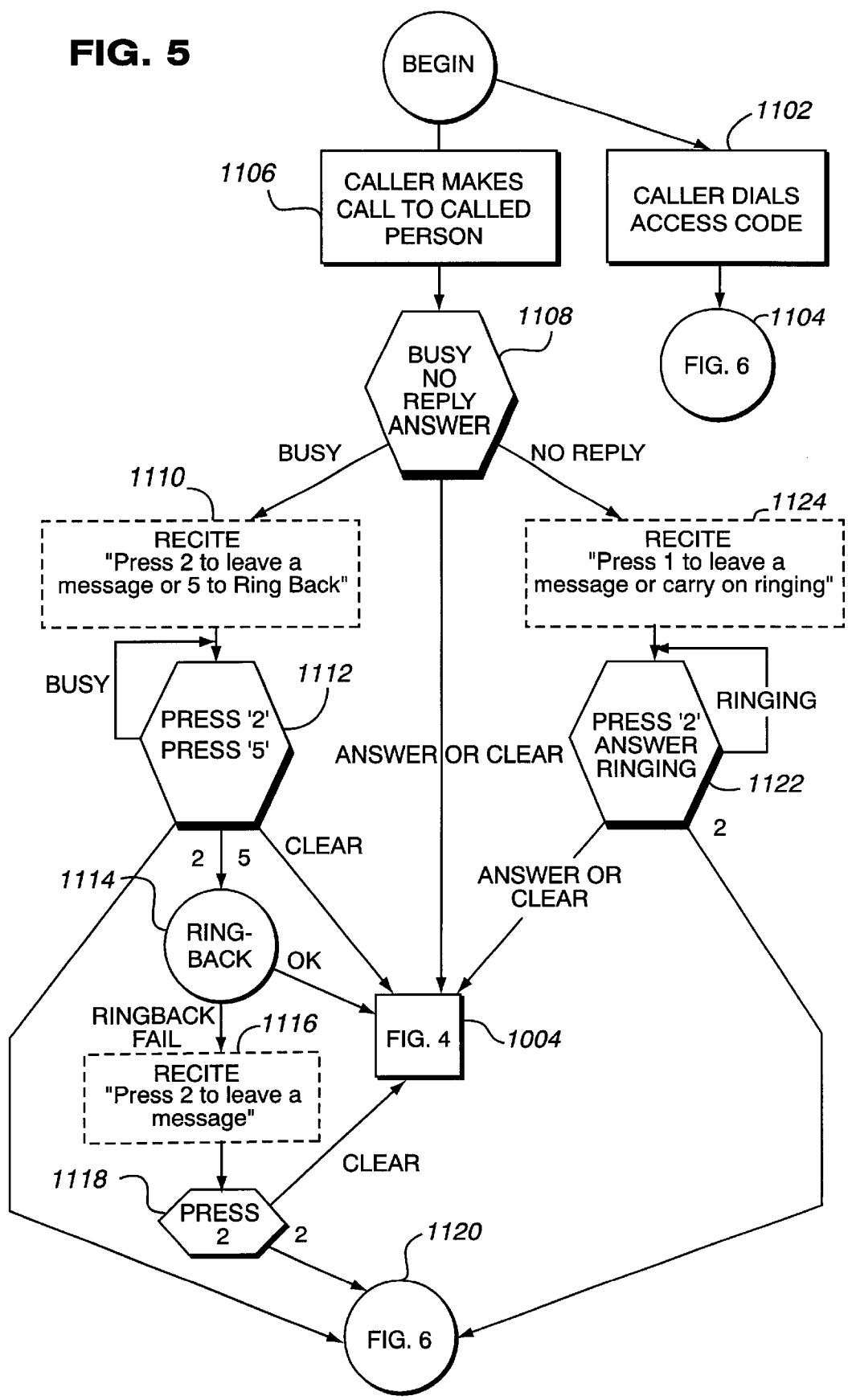

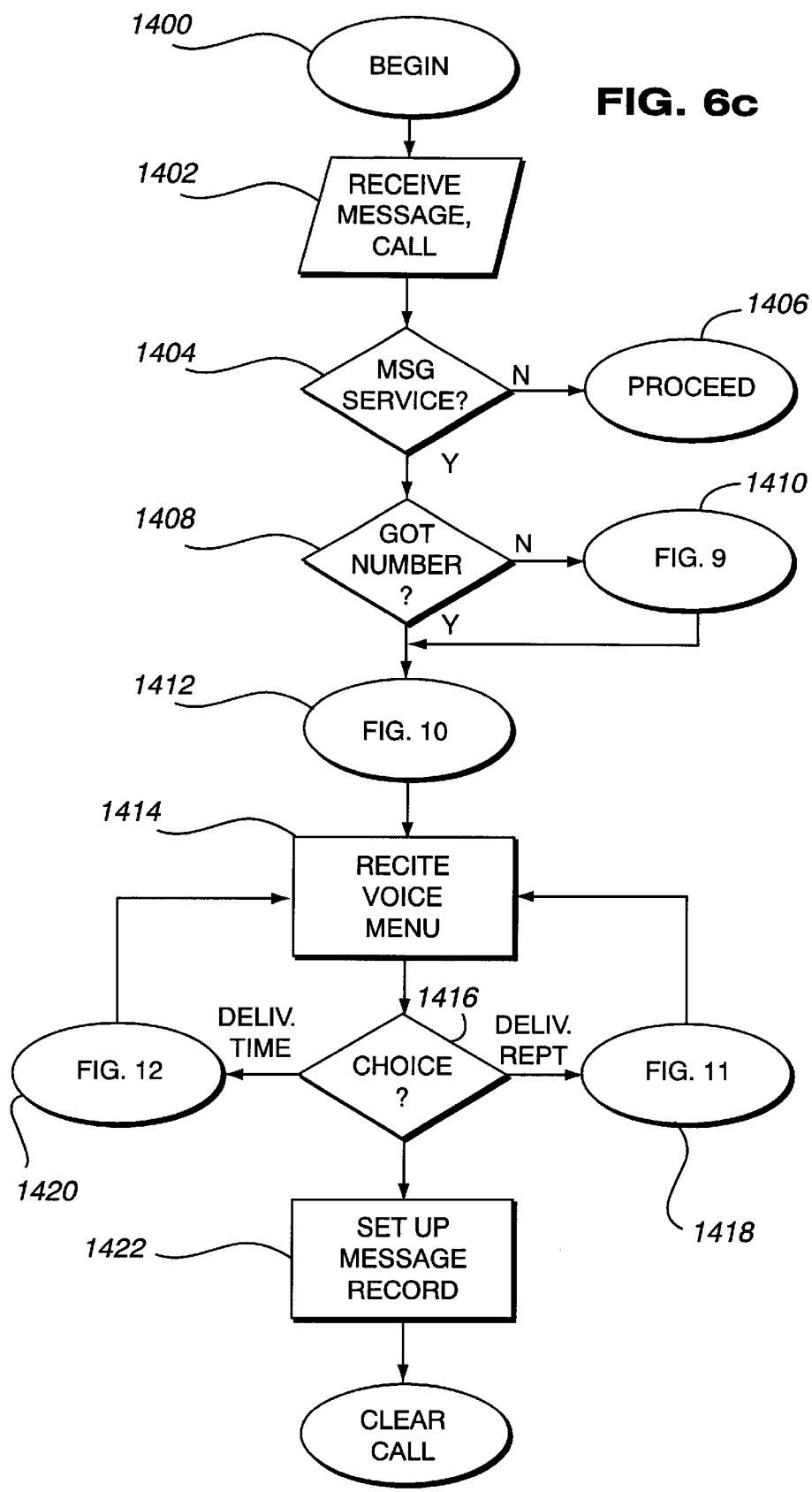

MESSAGE DELIVERY SYSTEM WITH SPECIAL FEATURES

BACKGROUND OF THE INVENTION

1. Field of the Invention

This invention relates to a method and apparatus for message delivery in telecommunications network.

2. Related Art

A service known as "True Message" has been advertised by AT&T. In this service, a caller may, if the called party is busy (or perhaps on other circumstances), choose to record a message for that called party. The network will then attempt later to set up a call to the called party and deliver the message. If the called party so wishes, they can deposit a message in reply for the calling party.

It may be perceived that the system thus described has similarity to conventional voice mail boxes, in which a message is left for a called party if they are unavailable, and to "call completion" services using such mail boxes (as described in, for example, U.S. Pat. No. 5,313,515).

However, there is a difference. For voice mail boxes and call completion services, the message is stored in a mail box which is linked to the identity of the called party. Thus, the service can only be provided when the called party has made arrangements to enable it. With message delivery services such as the above described "True Message" service, the message is stored in a record linked to the identity of the calling party, and therefore requires no arrangements to have been by the called party. Rather than being deposited for access at the leisure of the called party, the message delivery is specified by the calling party.

SUMMARY OF THE INVENTION

The present invention provides various improvements in a message delivery service of this type.

In a first aspect, the invention provides a call delivery service in which the network will, under predetermined conditions (for example, at the request of the called party), set up a call from the called party back to the calling party after delivering the message.

In another aspect, the invention provides a message delivery service in which the calling party may specify a message delivery time. Preferably, the system will then check whether the delivery time corresponds to an antisocial period (for example, overnight) and will so indicate to the calling party.

In another aspect, the invention provides a message delivery service in which the dial number of the calling party is stored and is supplied as the calling line identification with the message delivery. Thus, called parties with calling line identification display terminals can see who the message is from before receiving it, reducing the risks of delivery of an unwelcome or harassing message.

In another aspect, the invention provides a call delivery system in which the announcements of the availability of the service are provided from dispersed announcement stores, rather than from the network point (e.g. speech processor unit) at which the messages are stored and from which they are delivered. This reduces network congestion by limiting connections to these network points to those occasions where the service is to be invoked.

BRIEF DESCRIPTION OF THE DRAWINGS

Other embodiments and advantageous features of the present invention will be clear from the following description and claims.

By way of example only, embodiments of the invention will now be described in greater detail with reference to the accompanying drawings, in which:

FIG. 4 is a flow diagram showing the overall operation of an embodiment of the invention;

FIG. 5 is a flow diagram showing the operation of a service invocation phase of the embodiment of FIG. 4;

FIG. 6c is a flow diagram showing the flow of operation of a speech processor forming part of the embodiment of FIGS. 4–6.

DETAILED DESCRIPTION OF EXEMPLARY EMBODIMENTS

Figure 1:
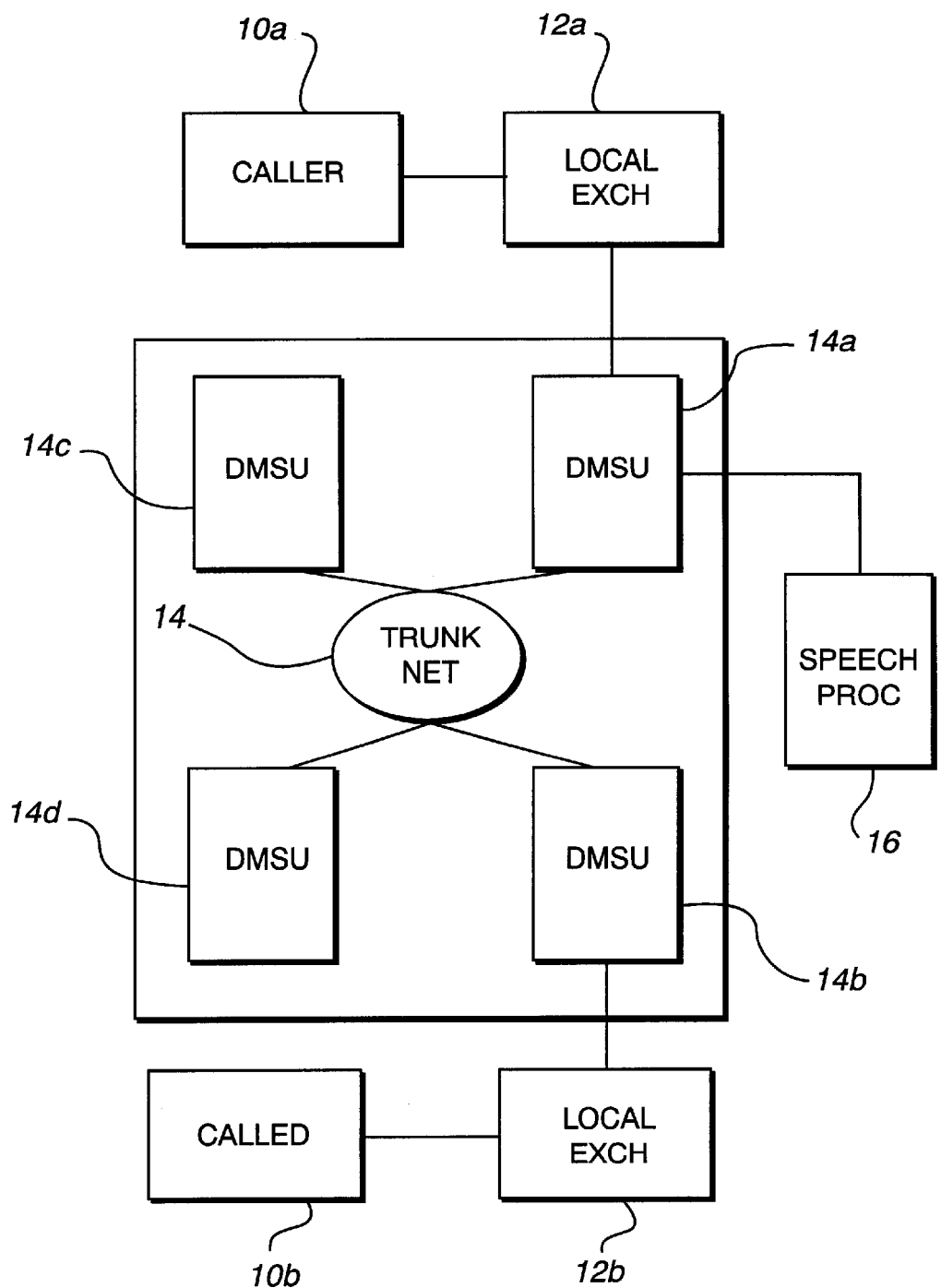
FIG. 1 is a block diagram of a telecommunications system with which the present invention may be employed.

Referring to FIG. 1, a telecommunications system with which the invention may be used comprises calling and called telephone terminal equipment 10a, 10b (e.g. DTMF phones); a first local exchange 12a connected to the calling telephone terminal 10a; a second local exchange 12b connected to the called telephone terminal 10b; a trunk network 14 comprising a plurality of interconnected digital main switching units 14a–14d including a first digital main switching unit (exchange) to which the calling terminal local exchange 12a is connected and a second main switching unit to which the called terminal local exchange 12b is connected.

Figure 2:
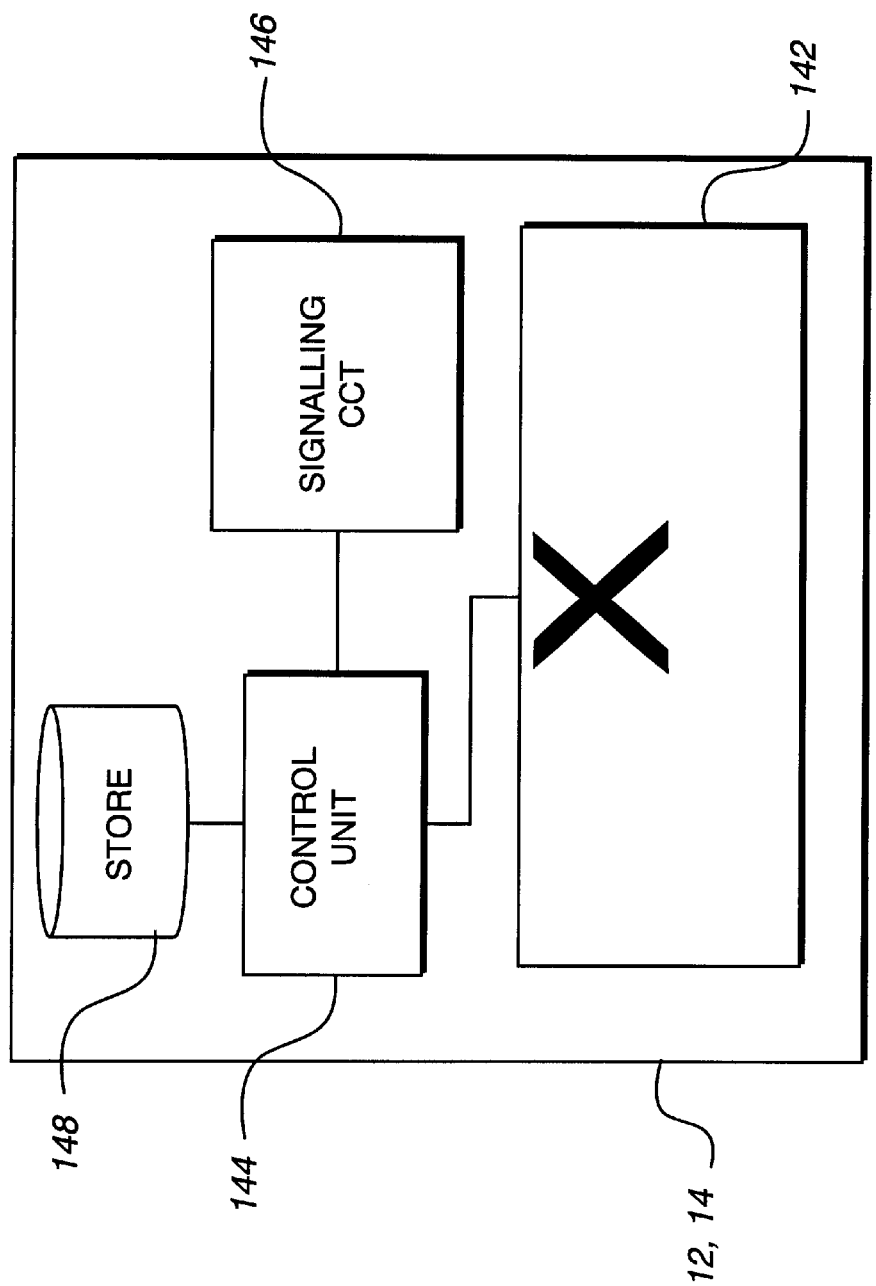
FIG. 2 is a block diagram of an exchange forming part of the system of FIG. 1.

Referring to FIG. 2, the exchanges 14 each comprise, in conventional fashion, a switch 142 controlled by a control processor 144 which is coupled to a signalling unit 146 for signalling with other exchanges, network management centres (not shown) and so on; and a store 148 for storing call record and other data.

Each local exchange 12 may be a System X exchange. Each main switching unit 14 may be an AXE 10 exchange, for example.

Figure 3:
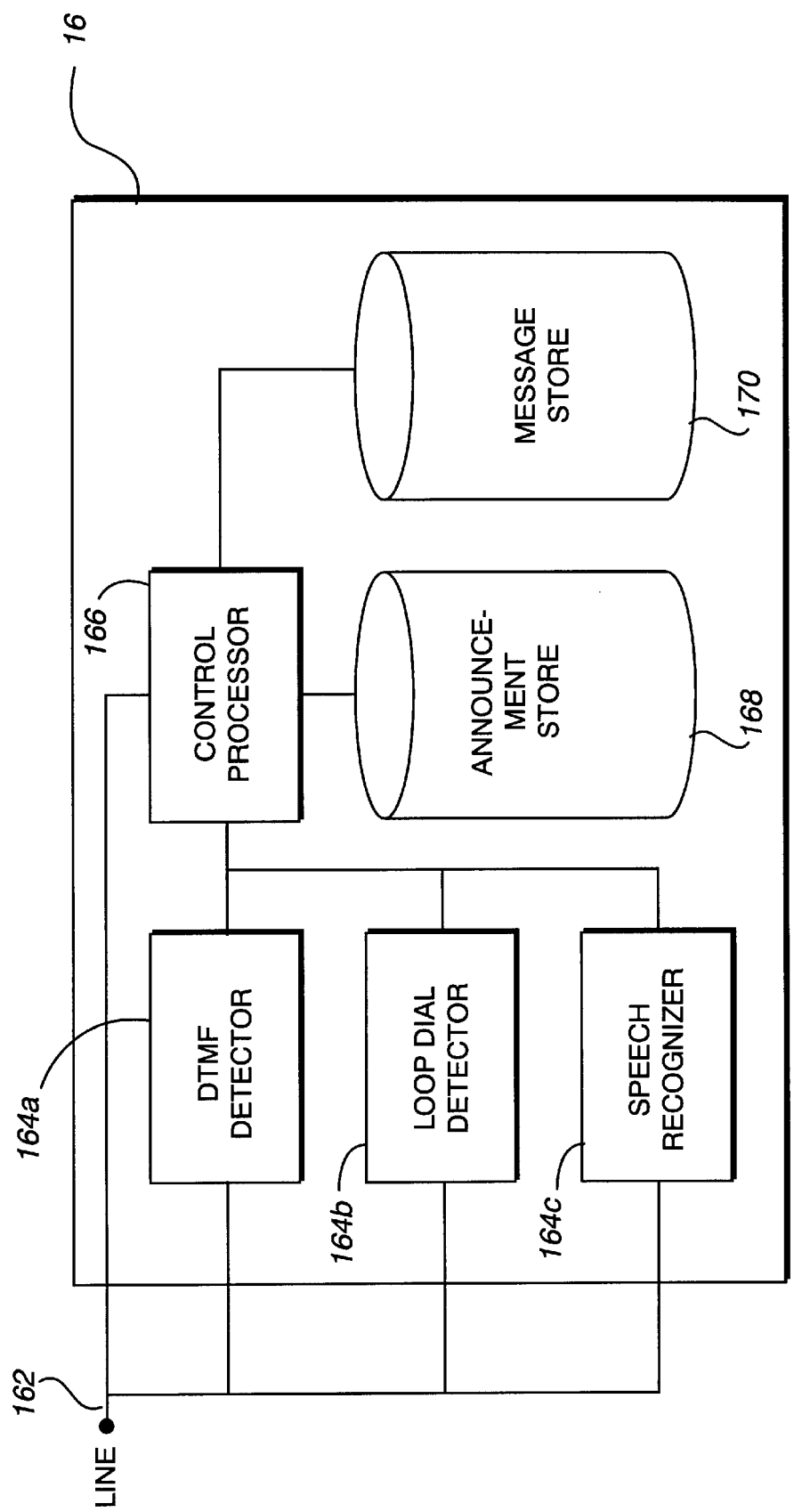
FIG. 3 is a block diagram of a speech processing device forming part of the system of FIG. 1.

Referring to FIG. 3, the speech processor device 16 comprises an input node 162 for receiving a line from the trunk network 14; a DTMF recognition circuit 164a for recognising DTMF tones and generating a digital output representing the detected DTMF symbol (i.e. one of the digits 0 to 9, the # symbol or the * symbol); a loop dial (i.e pulse) recognition circuit 164b for recognising digits from dial pulses generated by a loop dialing telephone and generating a corresponding digital output representing the recognised digits; and a voice recognition unit 164c arranged to recognise the digits 0 through 9, and common words such as "yes" and "no".

The outputs of the DTMF recognition circuit 164a, loop dial recognition circuit 164b and voice recognition unit 164c are supplied to a control device 166 such as a microprocessor or DSP device, which controls the operation of the speech Processor 16.

Also supplied are a store 168 for recorder announcements, and a store 170 for recording voice messages, together with delivery data.

The speech processor may in particular be a speech applications platform, and preferable is the speech applications platform described in our earlier application GB 9619958.3 filed on Sep. 25, 1996 U.S. patent application Ser. No. 09/029,615 filed Mar. 5, 1998, and/or WO 93/26113, the contents of each of which are incorporated herein by reference.

Referring to FIG. 4, an overview of the general operation of this embodiment of the invention will be given.

The invention may be considered to proceed in four main phases; invocation of the service by the calling party; depositing of the message by the calling party; delivery of the message by the system; and reply to the message by the calling party. A fifth phase of reporting success or otherwise of the delivery may also, optionally, take place if the calling party so desires.

Thus, in a step 1002, the telecommunications network determines whether the calling party wishes to invoke the message delivery service. If not, then in a step 1004, normal call handling is resumed.

If the service is invoked, then in a step 1006, the system records the message to be delivered and then ends the call (step 1008).

At some time later, when the message is to be delivered, in step 1010, the system retrieves the message and in a step 1012 attempts to deliver the message to the called party. If delivery is not possible, the message is requeued for later delivery.

If delivery is possible (step 1014), the recorded message is played to the receiving party. In a step 1016, it is determined whether the called party wishes to reply or not; if not, then the call terminates (step 1018). If the called party wishes in turn to deposit a message for the calling party, then the system proceeds to permit him to deposit a message for subsequent delivery, in similar fashion to that described above, illustrated as a return to step 1006.

If the called party wishes to speak directly to the (originally) calling party, then in step 1020, the system sets up a call to the calling party. During the progress of this call, the message delivery service may also be invoked (shown as a return to step 1002).

The process outlined above will now be described in greater detail.

When the calling party terminal 10a goes off hook, the calling party local exchange 12a starts to monitor the line. If (step 1102) the caller dials a recognisable access code (e.g. the digit 2) the exchange proceeds to FIG. 5 (step 1104).

If not, the exchange 12a allows the caller to dial the dial number of the called party, and sets up a call via switch 12 and the trunk network 14 (step 1106) as would normally occur in a telephone network.

The exchange 12a continues to monitor the line condition (step 1108). If the call is either answered or cleared down by the calling party, then the exchange resumes normal call handling, and either allows the call to continue or clears it down respectively (step 1004).

If the line to the called party is busy, the control unit 144 accesses the store 148 to retrieve a recorded announcement (e.g. stored as a digital recording) and reads out the announcement on the line to the calling party terminal 10a via an analog to diaital converter forming part of the processor 144 (and not separately shown) in step 1110.

The announcement may, for example, say "The party you have called is busy. Press 2 to leave a message."

In this embodiment, the telecommunications network provides a "ring back" service, as does that operated by British Telecommunications plc in the UK. This feature (well known in itself) causes the network to monitor the condition of the called party line, and on termination of the busy condition, to set up a call from the calling to the called party. Accordingly, in this embodiment, the message continues "or five to ring back". As the ring back service is well known of itself it will not be discussed further herein.

In step 1112, the exchange 12a continues to monitor the condition of the line from the calling party. If the calling party clears the line, the exchange proceeds to step 1004. If the calling party presses the code for the ring back service (here the digit 5) the exchange 12a proceeds to set up the ring back service (step 1114) and proceeds to step 1004 thereafter.

If it proves impossible to set up the ring back service (step 1116) the exchange processor 144 retrieves a further recorded message from the store 148 and synthesises the message on the line to the calling party. The message may say "Press 2 to leave a message"; in other words, prompts the calling party to enter an access code indicating the invocation of the message delivery service (here, the digit 2).

If (step 1118) the user clears down the call, the exchange 12a proceeds to step 1004 as before. If (step 1118) it is detected that the caller presses the access code 2, or if it is detected at step 1112 that the calling party generates the access code 2, the exchange processor 144 proceeds to FIG. 6 (step 1120).

If the called party terminal 10b does not reply, the exchange processor 144 waits a predetermined number of rings, whist monitoring the calling party line (step 1122). After the predetermined number of rings, the processor 144 accesses the store 148 and retrieves a message, which is synthesised by the processor as before, and added to the ringing tone generated on the line to the calling party terminal 10a so as to be audible over the ringing tone. The message may say "Press 2 to leave a message or carry on ringing".

After reciting the message (step 1124) the exchange 12a continues to monitor the calling party terminal line (step 1122).

If at any stage the line to the called party is answered, or the calling party clears down the line, the exchange proceeds to step 1004, as previously.

If the calling terminal generates the service access code (i.e. the digit 2) in step 1122, the exchange proceeds to step 1120 as above.

Figure 6A:
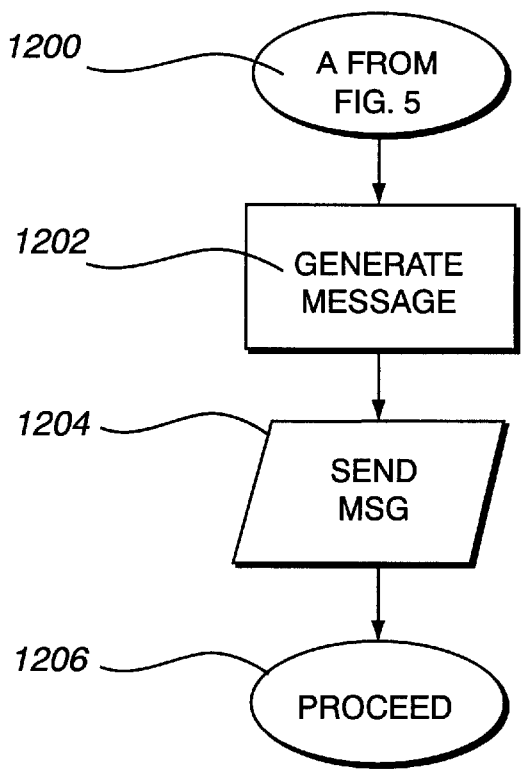
FIG. 6a is a flow diagram showing the operation of an exchange during the invocation process of FIG. 5.
Figure 6B:
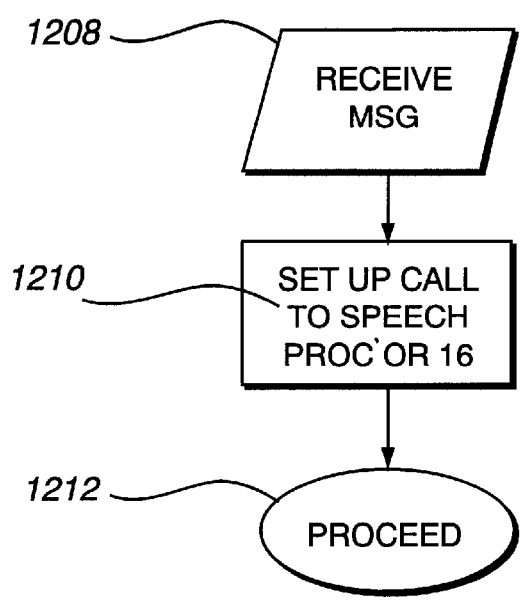
FIG. 6b is a flow diagram showing the operation of a further exchange in the invocation process of FIG. 5.
Figure 7:
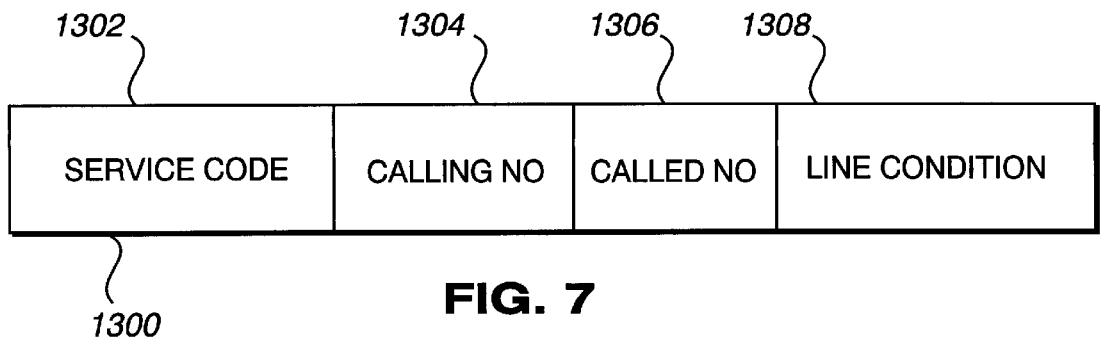
FIG. 7 is a diagram illustrating the structure of a message transmitted to the speech processor during the invocation phase of FIGS. 5–6.

Referring now to FIG. 6a, in a step 1202, the exchange processor generates a message 1300, shown in FIG. 7, comprising a service code portion 1302 consisting of a code indicating that the message relates to the call delivery service, a calling number portion 1304 indicating the dial number of the calling party terminal 10a; a called number portion 1306 indicating the dial number of the called party terminal 10b; and a line condition portion 1308 indicating the line condition circumstances under which the calling party terminal elected to invoke the service (e.g. busy, no answer or prior to dialing).

If the line condition portion 1308 indicates that the service was invoked prior to dialling, there will be no called party number.

In step 1204, the processor 144 then routes the message via the signalling circuit 146 to the trunk exchange to which the call (if any) is currently set up, or if no call is in progress, to a predetermined trunk exchange 14a. The exchange 12a then proceeds to route the call to that trunk exchange 14a via the switch 142.

In step 1208 (FIG. 6b), the trunk exchange 14a receives the message 1300 and, responsive thereto, sets up a circuit via its switch 142 between the local exchange 12a and the speech processor 16. After setting up the call, the trunk exchange proceeds to handle the call in conventional fashion (step 1212).

Where the line condition field 1308 indicated a line that was either busy or failed to answer, the exchange 14a continues to monitor the called party line condition, and when the line ceases to be busy, or next goes off hook, sends a corresponding signal to the speech processor 16.

Referring now to FIG. 6c, the speech processor 16 receives the message (step 1402) and accepts the call from the exchange 14a. In a step 1404, the speech processor determines that the message delivery service is required. If not (step 1406) the speech processor determines what other service is required, if any.

Figure 9:
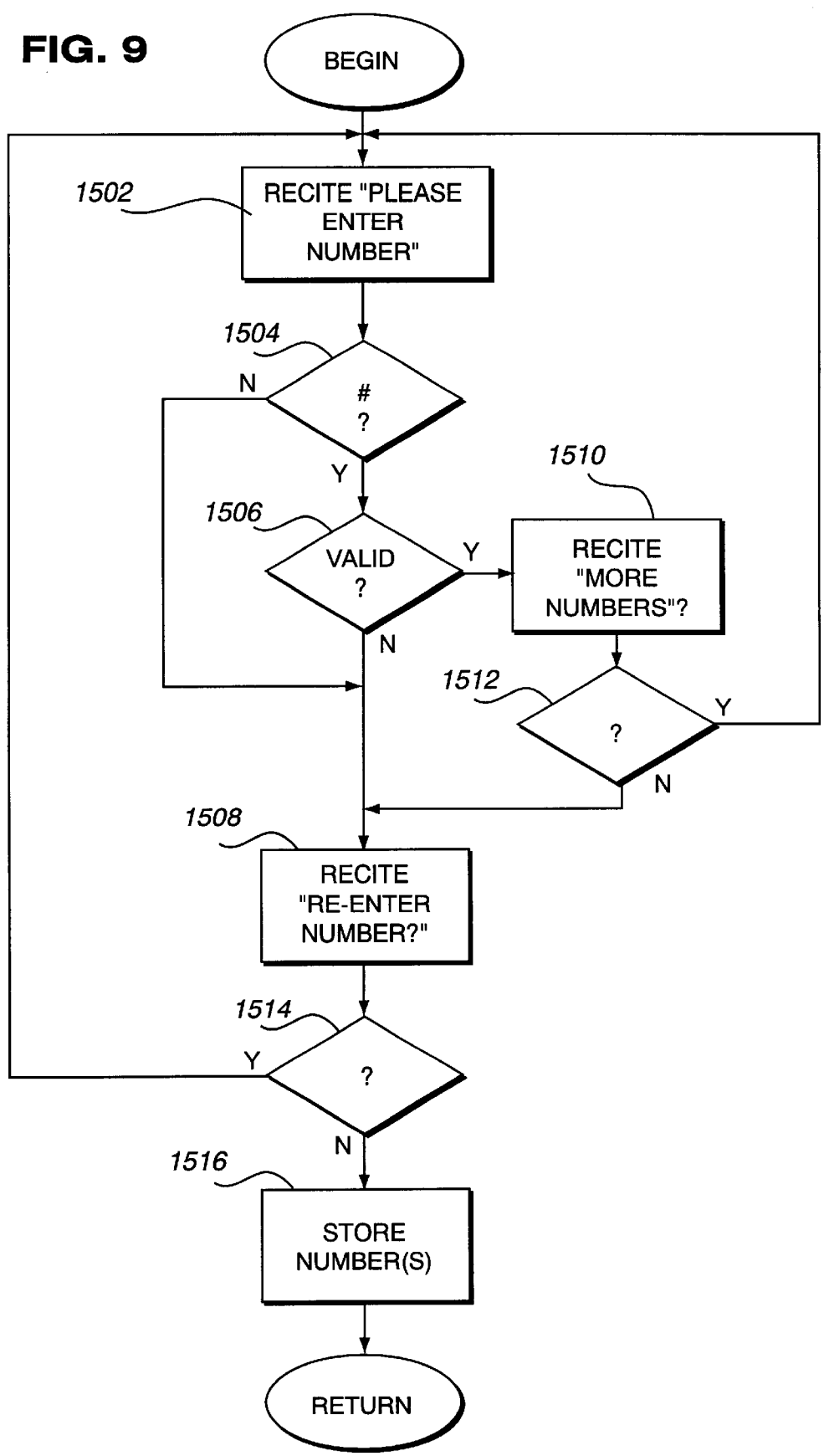
FIG. 9 is a flow diagram illustrating a process of acquiring a called party number within the process of FIG. 6c.

In a step 1408, the speech processor 16 determines, from the message portion 1308, and the message portion 1306, whether the called party number is present; if not (step 1410) the speech processor proceeds to execute FIG. 9 to obtain the called party number.

Figure 10:
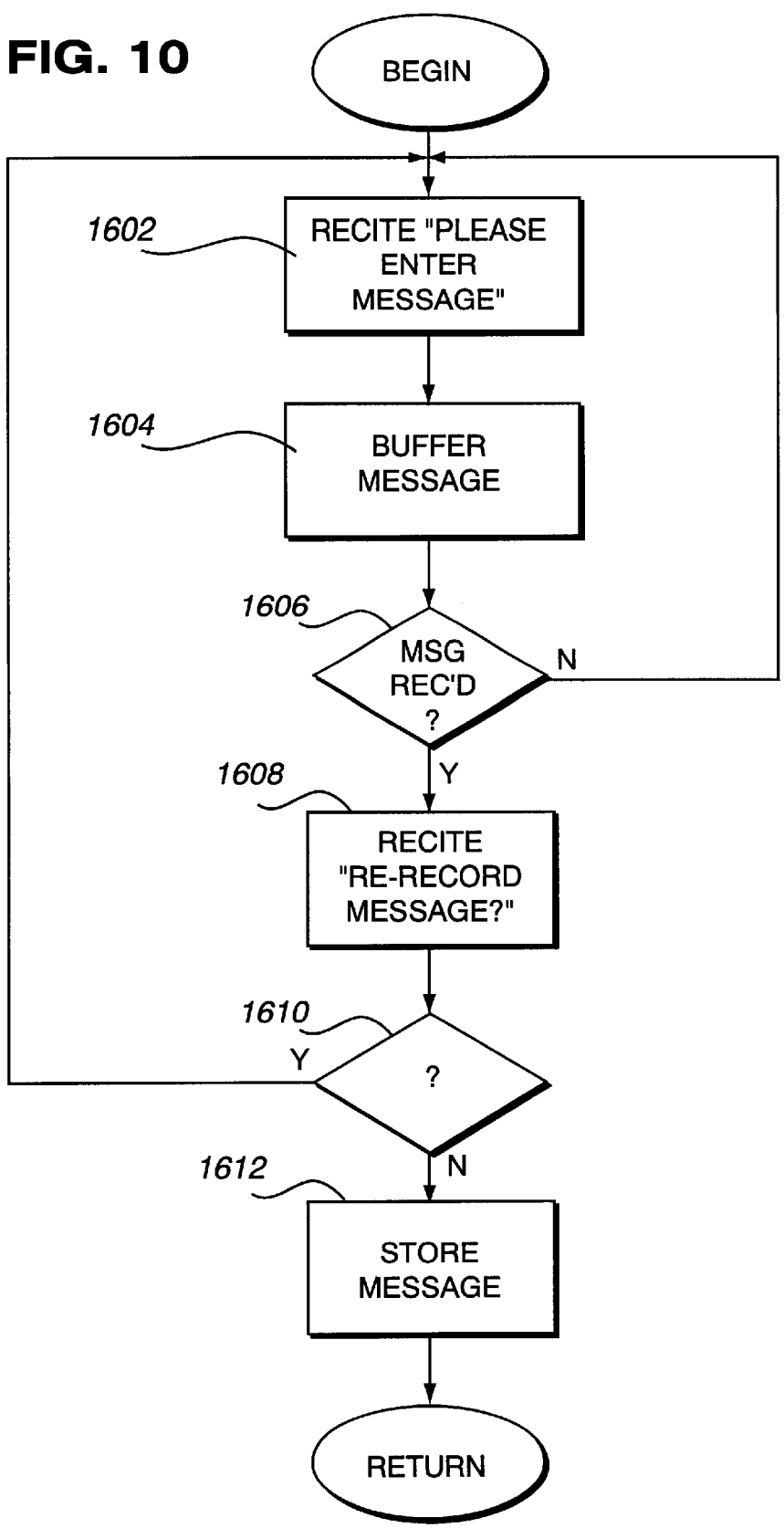
FIG. 10 is a flow diagram showing the process of recording a message for delivery within the process of FIG. 6c.

In step 1412, the speech processor 16 executes the process of FIG. 10 to input the message to be stored.

In step 1414, the control unit 166 accesses the store message store 168 and generates a voice menu message, which may be "To send your message press 1. To set the delivery time press 3. To request a delivery report press 5".

Other options which are often provided in voice messaging services, such as the option to review and edit the message, are also provided; these will not be discussed further herein.

Figure 8:
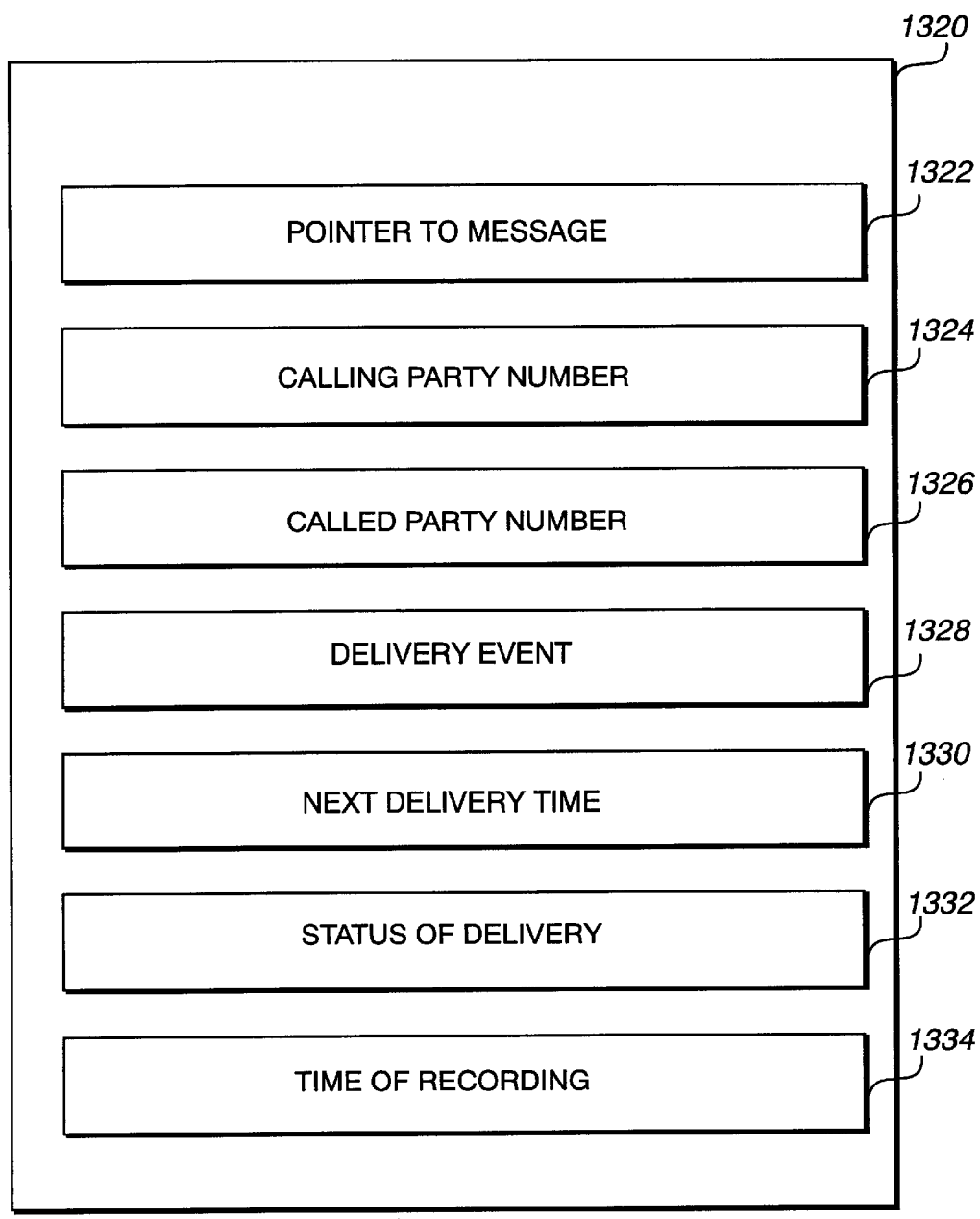
FIG. 8 is a diagram showing the structure of a call delivery record within the memory of the speech processor.
Figure 11:
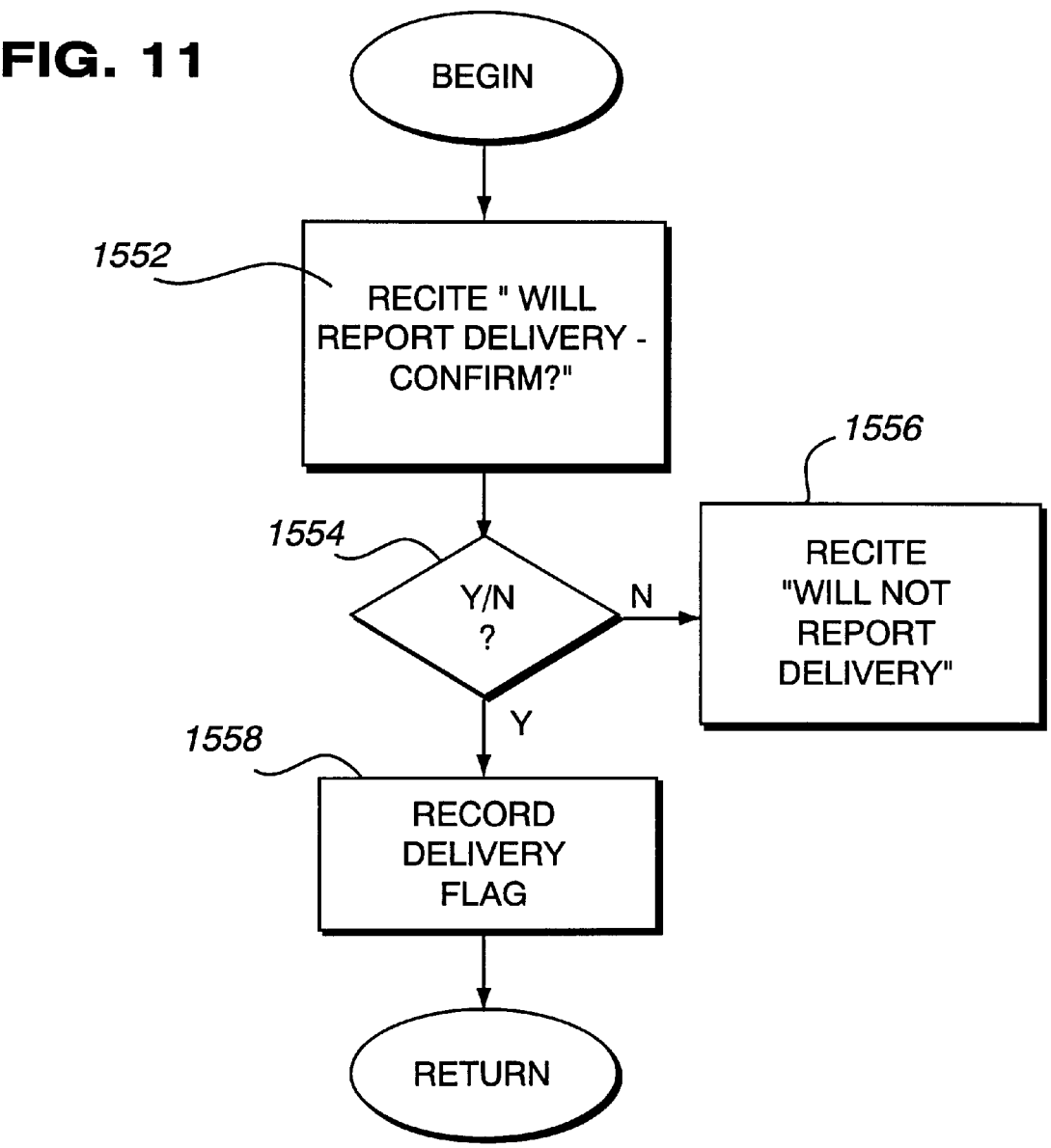
FIG. 11 is a flow diagram showing the process of recording a delivery report request within the process of FIG. 6c.
Figure 12:
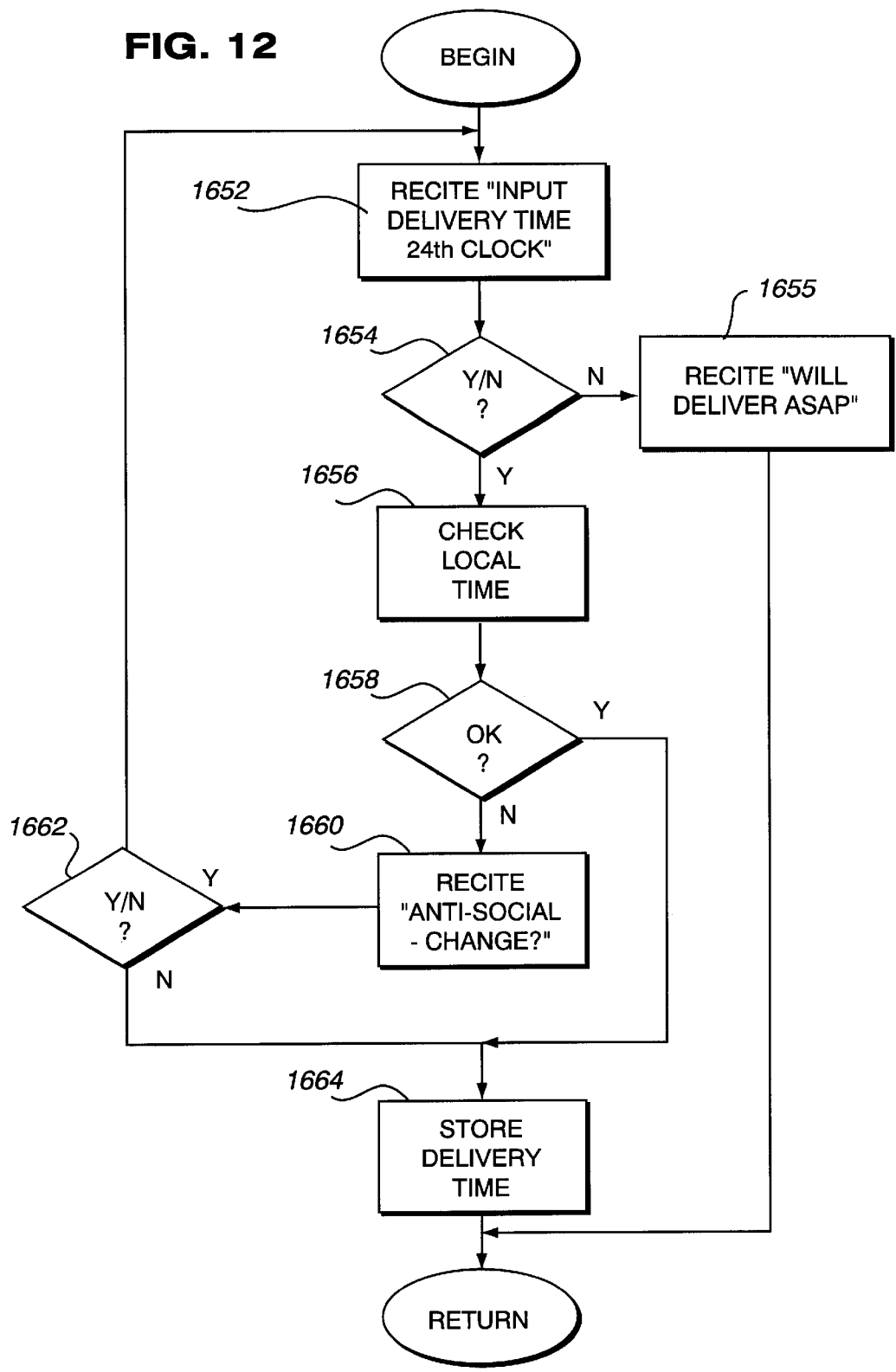
FIG. 12 is a flow diagram showing the process of acquiring a delivery time within the process of FIG. 6c.

In step 1416, the DTMF detection circuit 164a, loop dial detection circuit 164b and voice recognition circuit 164c await corresponding input from the user, and generate corresponding output signals to the processor 166, in response to which the processor executes the process of FIG. 11 (step 1418) if the response indicated the selection of a delivery report; executes the process of FIG. 12 (step 1420) if the response indicated a desire to set a delivery time, or proceeds to set up a message record of the type illustrated in FIG. 8 if neither of these options (nor any other option which may be present) is requested, in step 1422. Having set up the message record, the speech processor 16 clears down the call.

Having selected either the delivery report option or the delivery time setting option, after executing step 1418 or step 1420 the processor 166 returns to step 1414 to give the calling party the opportunity of selecting a further option if desired.

Referring to FIG. 8, a call record 1320 comprises a field 1322 containing a pointer to the stored message within the message store 170; a field 1324 containing the calling party number from the message 7; a field 1326 containing the called party number either from the message 1300 or obtained through the process of FIG. 6; a field 1328 containing the identity of the call event, if any, upon which delivery is to be attempted; a field 1330 containing the next delivery time (if any) at which delivery of the message is to be attempted; a field 1332 containing the current status of the delivery; and a field 1334 containing the time of recording of the message.

The content of the fields 1328–1334 is determined as follows. If the line condition field 1308 indicated a busy line, then the processor 166 records in the delivery event field 1328 an indication that call delivery is to be attempted on the next occasion when the line becomes free.

Thus, the delivery event field 1328 records the condition upon which the next attempt to deliver the message will occur, depending upon the called line condition when the invocation of the message delivery service was made.

If a delivery time was set by the calling party, then the first entry in the next delivery time field 1330 will contain that time. After an unsuccessful delivery attempt, the time stored in the next delivery time field 1330 is reset (incremented) by a predetermined period (for example, 10 minutes) to mark the next time on which an delivery attempt should be made, until the last of the predetermined number of delivery attempts (for example, 8) has been made.

The status of delivery field 1332 contains an indication of the number of unsuccessful delivery attempts, until either successful delivery is made (at which point the delivery time is recorded in the field) or all the predetermined number of attempts have unsuccessfully been made (in which case a failure to deliver a message is recorded).

Referring to FIG. 9, the process of entering a number will now be disclosed in greater detail.

In a step 1502, the processor 166 accesses the stored announcement stored 168 and retrieves a prompt message which may, for example, read "Please enter the phone number followed by square", and generates the message through the line via the exchanges 14 and 12 to the calling terminal 10a.

In response, the user enters the digits of the called number, followed by the "#" key. The DTMF recognition circuit 164a monitors the line, and if (step 1504) it outputs a sequence of digits followed by a # character to the processor 166, the processor 166 proceeds to step 1506.

If not, the processor 166 proceeds to step 1508, at which it accesses and recites a predetermined message prompting the user to re-enter the number. At step 1506, the processor 166 checks whether the input number is valid; for example, whether it has enough digits, whether the prefixes correspond to a valid national, local or international number; and whether the number is on a list of prohibited numbers including, for example, the numbers of the emergency services.

If the entered number is invalid for any of these reasons, the processor 166 proceeds to step 1508. If not, the processor 166 proceeds to step 1510, at which it retrieves and generates a prompt requesting the user to specify whether the message is also be delivered to any additional numbers (so as to enable a "broadcast mode" delivery to a number of different parties). The message may read "If you wish to deliver the message to further parties, please press 1. Otherwise, please press 2".

In step 1512, the DTMF detection circuit 164*a* recognises the code corresponding to the desire to record more numbers (e.g. the digit 1 in this case) and returns to step 1502, or else it fails to do so or recognises the code indicating that no more numbers are to be input. In this case, the called numbers are stored in respective records, and the process returns.

Referring to FIG. 10, the process of depositing a message will now be disclosed in greater detail.

In step 1602, the processor 166 accesses the recorded announcement store 168 and retrieves a message which is generated on the line to the calling party terminal 10*a*; the prompt message may for example read "Please enter your message after the tone. To end recording, press square", followed by a recorded tone.

In step 1604, the processor 166 records successive samples received from the line until the DTMF decoder 162*a* detects the # symbol.

If the # symbol is not detected, or if only background has been received before the # symbol (step 1606), the processor returns to step 1602.

If a message has successfully been recorded, then in step 1608 the processor synthesises a further recorded announcement prompt, to allow the calling party the opportunity of re-recording the message; the prompt may for example read "If you wish to use the message you have just recorded press 1. If not press 2 to re-record".

In step 1610, the DTMF decoder decodes the signal from the calling party; in the event that it indicates a desire to re-record, the processor 166 returns to step 1602. If not, the processor 166 proceeds, in step 1612, to score the buffered message in the message store 170, and insert a pointer to the message in the message record 1320 of FIG. 8 and the time of recording in the field 1334.

Referring to FIG. 11, the process of instructing a delivery report will now be disclosed in greater detail.

In a step 1552, the processor 166 accesses the announcement store 168 and generates an announcement confirming that delivery reports will be made, which may read "I will make eight attempts to deliver your message over the next two hours. I will ring you back when I deliver your message. I will also ring you back two hours from now if the person you called is still unavailable. To confirm your request press 1 or to cancel it press 2".

In step 1554, the DTMF detector 164*a* determines whether a 1 or 2 has been pressed; in the latter case, the processor 166 proceeds to step 1556 in which a confirmatory announcement that the delivery will not be reported is played to the calling party. It delivery reporting is confirmed in step 1554, the processor 166 records a delivery report flag in the delivery status field 1332 in step 1558.

The processor then returns to the process of FIG. 6.

Referring to FIG. 12, where a user has elected to select delivery time, the processor 166 accesses the stored message store 168 and generates a prompt on the line which may, for example, read "You will now be asked to enter the time, using the 24 hour clock, for the first message delivery attempt. Please enter the four digits of the time."

The DTMF detector circuit 164*a*, dial pulse is detector circuit 164*b* and voice recognition unit 164*c* now monitor the line and pass detected digits to the processor 166. If no valid 24 hour time is received, the processor 166 accesses the message store and retrieves and synthesises a message (step 1655) indicating that no valid time has been detected, and the message will be delivered as soon as possible. The process of FIG. 6*c* is then resumed.

On detection of a valid 24 hour time, in step 1654, the processor calculates, for the or each delivery telephone number, the local time, by referring to a look up table stored within the processor (not shown) storing, for each country code and regional prefix, the corresponding time zone as an offset from the current time. The processor 166 thereby calculates the local time to the called party at which the message will be received (as distinct from the time of delivery specified by the calling party).

In step 1658, the processor 166 compares the local delivery time for the called party with one or more predetermined antisocial time bands (for example, between the hours of 22:00 and 07:00).

If the delivery time falls outside these hours, the processor 166 proceeds to step 1664, to store the time within the delivery record. If, on the other hand, in step 1658 it is determined that the time falls within an antisocial period, in step 1660 the processor 166 accesses the announcement store 168 and retrieves and synthesises a message indicating that the time of delivery would be thought to be antisocial by some people, and asking the calling party to confirm whether they wish to proceed with this time or not.

In step 1662, the DTMF recognition circuit, dial pulse detection circuit 164*b* and speech recognition device 164*c* monitor the line and supply the calling party's response to the processor 166.

If (step 1662) the calling party indicates a desire to change the delivery time (e.g. by keying 1 on the calling telephone device) the processor 166 returns to step 1652. If not, the processor proceeds to step 1664.

Thus, after the operation of the process of FIGS. 6*a*–*c* and 9–12, the speech processor 16 has assembled a message delivery record 1320 for the or each called party to whom the message is to be delivered, together with a recorded message for delivery.

The operation of the delivery phase will now be described in greater detail.

Figure 13:
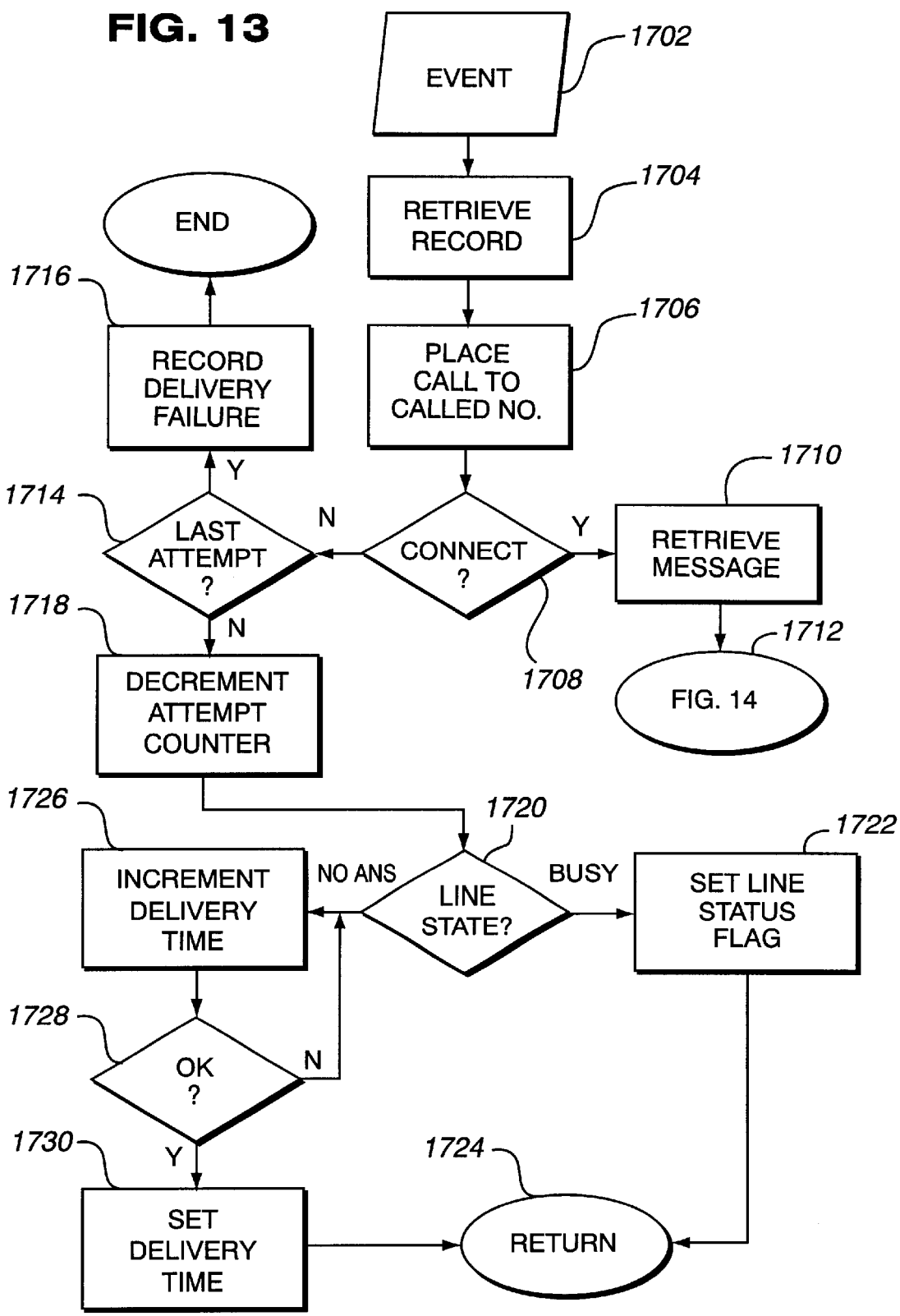
FIG. 13 is a flow diagram showing the process of scheduling and re-scheduling call delivery attempts.

Referring to FIG. 13, in a step 1702, an event triggers the initiation of the call delivery process. The event is either the reaching of the delivery time stored in the delivery time field 1330 of one of the delivery records 1320, or the reception by the speech processor 16 of a signal from an exchange 14 indicating the occurrence of one of the delivery events stored in a delivery event field 1328 (e.g. that the line to a desired subscriber has ceased to be busy, or a call initiation has been attempted).

For the purpose of monitoring the delivery times, the processor 166 comprises a clock device which generates an event on reaching one of the delivery times in known fashion.

In step 1704, the processor 166 retrieves the delivery record 1320 corresponding to the event, and in step 1706 the processor sets up a call to the called number stored in that record.

In step 1708, the processor 166 determines whether the call attempt has been successful and, if so, retrieves the message pointed to by the call record 1320 from the message store 170. The processor then performs the process of FIG. 14 in interacting with the called party, as will be described in greater detail below.

If the attempt to connect is unsuccessful, then (step 1714) the processor 166 determines whether this is the last of the predetermined number (for example 5) of attempts to be made, by reference to the delivery status field of the record 1320 and, if so, records a delivery failure in that field (step 1716) and terminates further attempts to deliver the message.

If this is not the last attempt to be made, then the attempt number stored in the delivery status field is decremented (step 1718) and the processor 166 determines (step 1720) the line state of the called party line. If the failure to connect was because the line was busy, the event field in the delivery record 1320 is set to trigger (step 1722) when the line ceases to be busy and the exchange 14b is signalled to monitor for the occurrence of this condition, so as to generate a message to the processor 16 when the line ceases to be busy. The processor 166 then returns (step 1724) from the process of FIG. 13.

If the called party did not answer, then (step 1726) the new delivery time is calculated by incrementing the previous delivery time (e.g. by 20 minutes) and, as described in relation to FIG. 12, the delivery time at the location of the called party is determined. If the delivery time would fall within antisocial time band (step 1728), the processor 166 continues to increment the delivery time until a time outside the band is reached. When it is determined that the delivery time is not within an antisocial band, the newly calculated delivery time is stored (step 1730) in the call record 1320 and the processor returns (step 1724) from the process of FIG. 13.

In this embodiment, in the delivery time incrementing step 1726, the increment increases over time; from 10 minutes initially to 1 hour at the last attempt.

Figure 14:
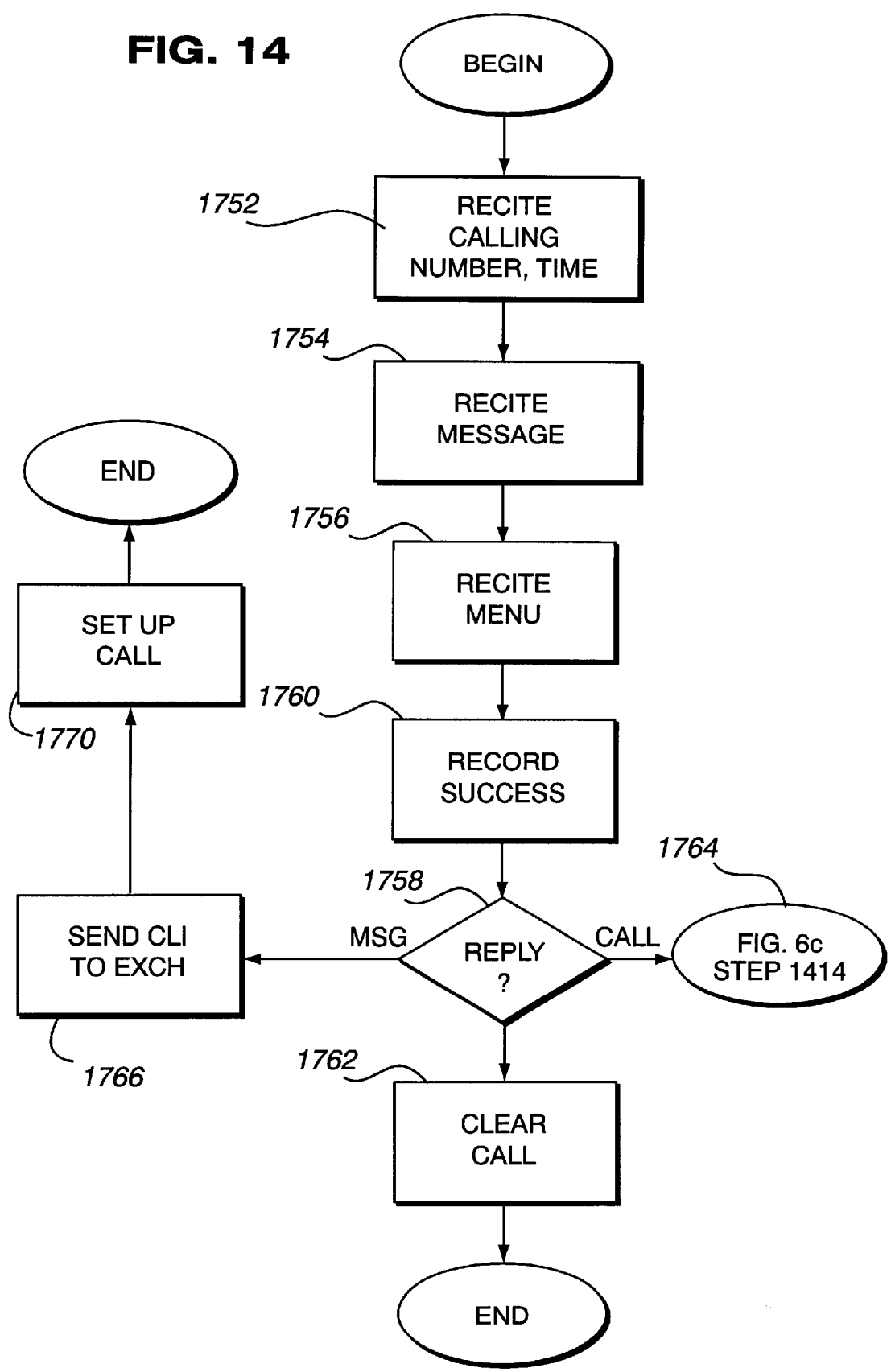
FIG. 14 is a flow diagram showing the process of delivering a call to the called party.

Referring to FIG. 14, on successful connection, the processor 166 accesses the stored message store 168 and retrieves a header message which gives data on the message to follow. The header message may, for example, read "The following message was left for this number at (time) by (calling number)", and outputs the message as speech to the called telephone 10b.

Then, in step 1754, the stored message itself is retrieved from the message store 170 and generated over the line to the called telephone 10b.

In step 1756, the processor 166 retrieves a stored message from the store 168 comprising a menu, which may for example say "To send a free reply, please say "1" or press 1; to place a free call to the calling party, please say "3" or press 3; to end say "2" or press 2."

In step 1760 processor 166 records a successful delivery in the delivery status field. The DTMF detection circuit, dial pulse detection circuit and voice recognition unit 164a–c then monitor the line from the called party. If the numeral 2 or no reply is detected (step 1758), the processor proceeds to clear down the call (step 1762) and ends the process of FIG. 14.

If (step 1758) it is determined that the called party has indicated a desire to leave a message, the processor proceeds (step 1764) to step 1414 of FIG. 6c, to allow the called party to record a message for delivery as described above.

If (step 1758) it is determined that the called party wishes to call back the calling party, then (step 1766) the speech processor 16 sends a message to the exchange 14b including the dial number of the original calling party and that of the called party currently on the line, and in response thereto, in step 1770, the exchange 14b sets up a call to the original calling party.

The process of FIG. 14 ends at that point, but it will be understood that if the original calling party telephone 10a is unavailable, then the process of the invention may be repeated provided that the original called party (i.e. the operator of the called telephone 10b) is a subscriber to the message delivery service.

Thus, after operation of FIG. 14, the message will have been delivered and the called party may either have recorded a reply for later delivery or access, or have attempted to place a call back to the original calling party. Many users will prefer the latter option, particularly where the delivered message is important or urgent or where the called party has a preference for avoiding message recordings.

Naturally, the process of FIG. 14 may including other features common in voice mail or other recorded message services, such as a menu option to review or repeat part or all of the message.

Figure 15:
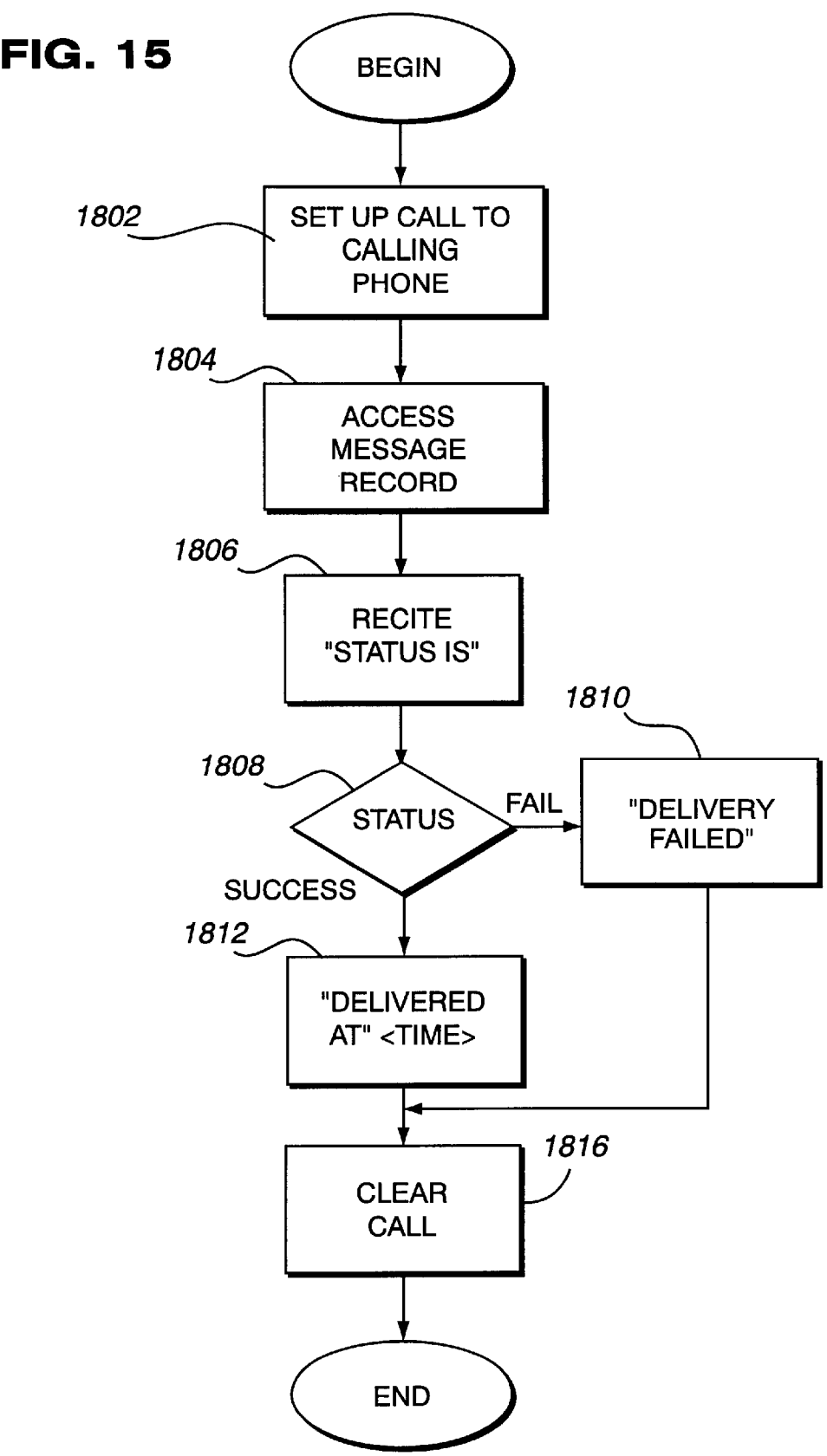
FIG. 15 is a flow diagram showing the process of delivering a status report to the calling party.

Referring to FIG. 15, the optional status reporting provided in the present embodiment will now be discussed in greater detail.

Where a delivery report was requested, after successful delivery of the call (step 1760 of FIG. 14) or delivery failure (step 1716 of FIG. 13) the process of FIG. 15 is performed. In step 1802, the speech processor 16 sets up a call to the calling telephone 10a.

In step 1804, the speech processor 16 accesses the message record 1320 for the calling telephone 10a, and in a step 1806, the processor 166 accesses the announcement store 168 and retrieves and generates an announcement indicating to the caller that he is connected to the status report service, and reciting "The status of your message delivery is".

In step 1808, the processor 166 determines from the delivery status field the current status of the message delivery. If the field records that delivery was unsuccessful, the processor 166 retrieves and generates a predetermined speech message indicating, for example, "Delivery of your message failed after eight attempts". The processor then hangs up the call (step 1816).

If (step 1808) the message is recorded as having been successfully delivered, the processor 166 retrieves and generates a message saying, for example "Your message was delivered at (time of delivery)".

If the delivery status field records that some attempts are still be made, the processor retrieves and synthesises (step 1814) a message which may, for example, say "After (N–X) attempts your message has not yet been delivered successfully. X further attempts will be made" where N is the total number of attempts to deliver (which may for example be 8), and X is the remaining number of attempts recorded in the delivery status field.

In this embodiment, the calling party may also actively seek a status report, in which case he dials an access code which is recognised by the exchange 14 and to which the exchange 14 responds by setting up call to the speech processor 16 with a message indicating that a status report has been requested. Thereafter, the speech processor 16 proceeds with steps 1804 onwards of FIG. 14.

In this embodiment, for the security of the called party, each exchange 14 is programmed to receive the number of the original calling telephone terminal 10 from the voice processor 16, and to supply this to the called party terminal as the calling line identification (CLI) to be displayed at the called party terminal 10b, thus giving the called party the option of not taking a message from particular numbers.

It will be apparent from the foregoing that the exact location of the speech processor unit 16 and any particular programmed exchanges 14, 12 is a matter of choice. It is particularly preferred, however, that, as shown above, the initial recorded announcements indicating the availability of the message delivery service should be located at distributed exchanges, or at stations connected thereto, so that it is unnecessary to provide a large number of speech processor units 16 or to connect a large number of calls to a limited number of such units.

The skilled person will recognise that one convenient way of implementing the invention may be to provide that, between the local exchange 12 and the trunk exchange 14, a service switching point (SSP) is provided which operates under control of a service control point (SCP) comprising a computer in signalling communication with the SSP, these two elements providing the line state monitoring in place of the exchange described above. Equally, however, other arrangements which rely on switching control or on intelligent network (IN) control may be used.

Some aspects of the charging and billing of the above-described service will now be disclosed. One possibility is simply to charge a single set amount for each invocation of the message service by a calling party, to that party, leaving the service free for the called party. However, since the options of leaving a return message and returning the call make the cost of providing the service variable, in this embodiment it is preferred to vary the charge to the calling party (keeping the service free for the called party) in dependence upon these options.

Initially, where the caller has failed to connect with the called party, no charges are made. On invoking the service by signalling a desire to record a message, a billing event is generated, and a billing record including data indicating the calling party number, the called party number and the length of the call to deposit the message, is created and sent to a billing record store (not shown), from which billing data is retrieved. This call is billed, as any other call, to the calling party.

On successful delivery of the message to the called party (step 1760), the speech processor 16 generates a billing record indicating the calling party number as the party to be charged, and indicating a (set) charge code for the successful delivery of the message. There is no charge for an unsuccessful delivery.

In a preferred embodiment, the caller may be offered the option of permitting or denying the called party the possibility of leaving a return message as described above. In this case, where the option of allowing a return message is permitted, the billing record generated by the speech processor 16 includes a charge code indicating a higher charge than the charge code where this option is not selected. Thus, whether or not the return message option is exercised by the called party, the calling party pays for the possibility where the original message was successfully delivered.

It would be possible to provide for the return call to be an option selectable by the calling party, and charged at a set rate, as described above. However, given that the length of a return call may substantially exceed that of a deposited message, it is preferred to make the charge dependant upon the length of the call.

Accordingly, in this embodiment, when the option of returning the call is selected by the called party, a billing record of the returned call, indicating that it should be billed to the original calling party (i.e. that it should be treated as a reverse-charge or collect call) is generated and sent to the billing store for billing purposes.

This is, in this embodiment, achieved at step 1770 on setup of the call from the speech processor 16 to the original calling party, by the generation of a billing record indicating that party as the party to be billed, and the called party (the party returning the call) as the "called" number, and recording the time of the call.

Rather than allowing the speech processor to generate the billing records, it may be preferable in some network architectures to permit the nodes of the network itself to do so, as for a normal call.

In such cases, various possibilities exist. For example, the network may provide the return call by detecting the end of the recorded message (e.g. by a tone) and, in response, provide the return call in the same way as the 1473 ringback service currently offered in the UK by the present applicant. The detection of the return call signal following the end of the message is used to generate a network trigger signal, causing the network to generate for the return call a billing record as described above.

As an alternative to generating a single billing record indicating the original calling party as the party to be billed, a more conventional billing record indicating the called party (call return originating party) as the party to be billed could be generated and transmitted to the billing centre, as in the existing 1473 ringback service, and a supplemental billing record indicating that the call is to be billed to the other party is also generated and sent (containing, for example, just the two numbers and a zero cost charge code). Such a call record could be generated in response to the detection of the end of message for example.

In such a case, the billing store is arranged to detect the receipt of the two records and to process the billing record in accordance with the supplemental billing record, to charge the original calling party.

Thus, in general, in some embodiments the speech processor 16 is provided with means for generating and sending billing records; in other embodiments the speech processor is provided with means for signalling with the nodes of the intelligent network within which it is located to cause the generation of appropriate records; and in further embodiments the billing centre is arranged to process the call records in accordance with supplementary signals, to the effect that the return call is free to the called party and paid by the (original) calling party. Naturally, other embodiments are possible. In particular, details of the billing mechanism disclosed in European application no. 97302605.7 could be employed herein.

In the particular context of the billing system and telecommunications network operated by the present applicant, which is described in "Multi-Service Billing System—A Platform For The Future" by J Crookes, British Telecom Technology Journal (BTTJ) vol. 15 No. 1 January 1997, the elements of the billing system then comprise a network mediation processor (NMP) arranged to manipulate billing records so that they resemble conventional Network Service call billing records; a service domain processor (SDP) arranged to receive billing records from the NMP and to price the services to which they relate; and a plurality of customer support service (CSS) processors, each relating to customers in a particular geographical area, arranged to accumulate the priced billing records and generate the bill to the customer. The NMP, SDP and CSS communicate through the telecommunications network. The billing records include a billable number (the number of the account to which the call is to be billed) and the billable number determines which CSS site should receive the billing record.

In addition to these conventional elements, described in the aforementioned paper, either the speech processor 16 or a separate intelligent network (IN) computer unit in communication therewith is equipped, as described above, to generate billing records and supply them to the NMP.

Where, as in the above described billing system, it is desired to provide an itemised bill, then in this embodiment, three different Network Services are defined; a first for recording the message, the second for delivery of the message (chargeable at one of two different rates as described above); and a third for the return call on a reverse charge basis.

On the calling party recording a message, the speech processor 16 or intelligent network unit will supply a Facility Bit for inclusion in the billing records, to indicate that this is a recording message network service. The calling line identity and destination number originally supplied are used for billing purposes since they correspond to the calling party and the called party respectively.

On the delivery of the message, the speech processor 16 will generate a billing record, with the CLI and billable number set as the calling party, and a Facility Bit set to indicate that a one-off fee is to be charged for the delivery. The charge will be routed to an NMP which will route it to the correct SDP and CSS by checking the billable number against a table, mapping ranges of numbers to CSS units. The charge will be raised as a fee only network service, in a similar way to, for example, the Reminder Charge currently operated in the applicant's network. A different Facility Bit is set to enable the SDP to price the fee differently if the calling party decides to permit the called party to supply a return message.

On recording a return message, the speech processor 16 sets a predetermined Tariff group value to indicate that this is a free call (as is performed at present in applicant's network in the ONVP service where a divert is to the customer's home phone number), and the speech processor 16 sets a different Facility Bit to highlight that the call will be free.

In the event of the return call, the speech processor or intelligent network unit will generate the billing record indicating the calling and called party's telephone numbers, and indicating that the Billable Number is the calling party (original calling party) number not the call returning party number. The billing record will have a specific SCN and Facility Bit setting to identify it as a reverse charge call.

The NMP will recognise the SCN and regulate the call record accordingly, and will set the CLI in the platform independent usage record (PIUR) to the original calling party and the destination number therein to the called party (i.e. it will swop the identities of the called and calling parties). The SCN may preferably be modified to resemble that of a Network Service call. The billing record will then be routed, in a similar way as for present applicant's operator assisted flexible charging (OAFC), by examination of the billable number in the PIUR, to the appropriate CSS for the original calling party.

The SDP will price the above billing records as Network Service calls and pass them to the appropriate CSS sites for generation of the bill on a periodic basis.

What is claimed is:

1. A method of voice message transmission performed within a telecommunications network, said method comprising:

recording, via a telephone line from a first terminal, a first message to a designated second terminal;

determining an instruction from said first terminal specifying a subsequent delivery attempt time;

attempting to connect to the second terminal via a telephone line at said subsequent delivery attempt time;

where said step of attempting to connect is successful, regenerating said recorded message to said second terminal;

comparing said subsequent delivery attempt time with at least one predetermined time window; and notifying the first terminal that said delivery attempt time lies within said predetermined window, and that delivery may therefore be unwelcome.

2. The method of claim 1, comprising determining a further instruction from said first terminal to proceed with said subsequent delivery attempt time.

3. The method of claim 1 wherein a call from a first user at said first terminal to a second user at said second terminal supplies and displays the telephone number of the first user to the second user.

4. The method of claim 1 further comprising the step of: under predetermined conditions, attempting to set up a return call to said first terminal.

5. The method of claim 4, in which the predetermined conditions comprise the success of a step of determining an instruction from said second terminal.

6. The method of claim 4, further comprising, under said predetermined conditions, recording a return message from said second terminal for said first terminal.

7. The method of claim 4, further comprising, where said step of attempting to connect is unsuccessful, repeating said step of attempting to connect to the second terminal.

8. The method of claim 7, in which in the step of repeating is performed after a predetermined interval.

9. The method of claim 6 further comprising the step of monitoring the condition of the line to said second terminal, and in which the step of attempting to connect to the second terminal is performed on occurrence of a predetermined detected line condition.

10. The method of claim 9, wherein said predetermined detected line condition corresponds to the line ceasing to be busy.

11. The method of claim 9, wherein the predetermined line condition corresponds to the next off-hook condition of said second terminal.

12. The method of claim 4, further comprising the step of accepting a first attempt delivery time from said first terminal, and in which said step of attempting is performed at said delivery attempt time.

13. The method of claim 1, in which said step of determining an instruction from said first terminal comprises monitoring the telephone line from the terminal concerned.

14. The method of claim 13, in which said step of monitoring comprises dial tone detection.

15. The method of claim 13, in which said step of monitoring comprises dial pulse detection.

16. The method of claim 13, in which said step of monitoring comprises speech recognition.

17. The method of claim 4, in which the network is arranged to provide said return call free of charge to the account associated with said second terminal.

18. The method of claim 17, wherein said network is arranged to generate a charge record for said return call, and to process said charge record so as to charge an account associated with said first terminal.

19. The method of claim 18, wherein said charge record indicates the duration of said return call.

20. A telecommunications network arranged to perform the method of claim 1.

21. The network of claim 20, which comprises a plurality of telecommunications exchanges linking said first and second terminals and a speech processor device connected to one or more of said exchanges so as to be connectable to said first and second terminals.

22. The network of claim 21, further comprising a plurality of stores distributed from said at least one speech processor device, said store recording a message indicating the availability of said method.

23. The method of claim 1 where said step of attempting to connect is unsuccessful, incrementing said subsequent delivery attempt time to a later delivery attempt time;

comparing said later delivery attempt time with at least one predetermined time window;

incrementing further said later delivery attempt time if said later delivery attempt time lies within said predetermined time window, until said later delivery attempt time lies outside said predetermined time window; and repeating said step of attempting to connect to the second terminal at a later delivery attempt time;

where said step of attempting to connect is successful, replaying said recorded message to said second terminal.

24. The method of claim 23 further comprising the steps of:

notifying the first terminal that said subsequent delivery attempt time lies within said predetermined window; and determining a further instruction from said first terminal to proceed with said subsequent delivery attempt time.

25. A speech processor device for performing voice message delivery, said speech processor device comprising:

means for recording, via a telephone line from a first terminal, a voice message for a designated second terminal;

wherein the speech processor device is arranged to accept a subsequent delivery attempt time from the first terminal;

means for comparing said subsequent delivery attempt time with at least one predetermined time window;

means for notifying the first terminal that said subsequent delivery attempt time lies within said predetermined window and that delivery may therefore be unwelcome;

means for determining a further instruction from said first terminal to proceed with said subsequent delivery attempt time;

means responsive to said further instruction for attempting to connect to the second terminal via a telephone line at said subsequent delivery attempt time; and means for regenerating said recorded message to said second terminal where said step of attempting to connect thereto is successful.

26. A speech processor device as in claim 25 further comprising:

means for instructing the set up of a return call from the second terminal to the first under predetermined conditions.

27. The speech processor device of claim 25 wherein the speech processor device is arranged to supply a telephone number of the first terminal to appear as a calling line identification number for display at the second terminal on attempting to connect.

28. The speech processor device as in claim 25 further comprising:

means for incrementing said subsequent delivery attempt time to a later delivery attempt time where said attempt to connect to the second terminal is unsuccessful;

means for comparing said later delivery attempt time with said at least one predetermined time window;

means for incrementing further said later delivery attempt time if said later delivery attempt time lies within said predetermined time window, until said later delivery attempt time lies outside said predetermined time window; and means for repeating said attempt to connect to the second terminal at a later delivery attempt time;

wherein where the attempt to connect is successful, replaying recorded message to said second terminal.

29. The speech processor device of claim 28 further comprising:

means for notifying the first terminal that said subsequent delivery time lies within said predetermined time window; and means for determining a further instruction from said first terminal to proceed with said subsequent delivery attempt time.

* * * * *